(12) United States Patent
Pan

(10) Patent No.: US 8,576,849 B2
(45) Date of Patent: Nov. 5, 2013

(54) METHOD AND SYSTEM FOR REALIZING TRANSMISSION OF MESSAGE BETWEEN AN EXTENDED PROCESSOR AND SWITCH CHIP

(75) Inventor: Tingshan Pan, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 147 days.

(21) Appl. No.: 13/375,266

(22) PCT Filed: Apr. 26, 2010

(86) PCT No.: PCT/CN2010/072207
§ 371 (c)(1),
(2), (4) Date: Nov. 30, 2011

(87) PCT Pub. No.: WO2010/139216
PCT Pub. Date: Dec. 9, 2010

(65) Prior Publication Data
US 2012/0076147 A1  Mar. 29, 2012

(30) Foreign Application Priority Data
Jun. 5, 2009 (CN) .......................... 2009 1 0107678

(51) Int. Cl.
*H04L 12/28* (2006.01)
*H04L 12/56* (2011.01)
(52) U.S. Cl.
USPC ......................................................... 370/392
(58) Field of Classification Search
USPC .................................................. 370/389, 392
See application file for complete search history.

(56) References Cited

U.S. PATENT DOCUMENTS

| 7,068,654 B1 | 6/2006 | Joseph et al. |
| 7,174,429 B2 | 2/2007 | Revilla et al. |
| 2002/0046271 A1* | 4/2002 | Huang .......................... 709/223 |
| 2008/0037544 A1 | 2/2008 | Yano et al. |

FOREIGN PATENT DOCUMENTS

| CN | 1608250 A | 4/2005 |
| CN | 101106532 A | 1/2008 |
| CN | 101610217 A | 12/2009 |

OTHER PUBLICATIONS

English translation of international search report of PCT/CN2010/072207.

* cited by examiner

*Primary Examiner* — Ronald Abelson
(74) *Attorney, Agent, or Firm* — McClure, Qualey & Rodack, LLP

(57) ABSTRACT

The invention discloses a method and system for realizing transmission of message between an extended processor and a switch chip. The switch chip amends the destination MAC of the received first message to be transmitted to the extended processor as the first destination MAC, and then transmit the first message to the extended processor, wherein the first destination MAC corresponds to the service physical port of the switch chip for receiving the first message; the extended processor can resolve the first destination MAC to learn that the first message comes from the service physical port. The method and system of the invention can realize transmission of message between the extended processor and the switch chip.

14 Claims, 1 Drawing Sheet

METHOD AND SYSTEM FOR REALIZING TRANSMISSION OF MESSAGE BETWEEN AN EXTENDED PROCESSOR AND SWITCH CHIP

CROSS REFERENCE RELATED APPLICATIONS:

This application is a national phase of PCT/CN2010/072207 filed Apr. 26, 2010, which claims priority to China Application Serial No. 200910107678.9, filed Jun. 5, 2009, both of which are entirely incorporated herein by reference.

TECHNICAL FIELD

The present invention relates to communication technology field, and especially relates to method and system for realizing transmission of message between an extended processor and a switch chip.

BACKGROUND OF THE RELATED ART

In the more sophisticated switch device, there are more types of protocol messages to process, if these messages are all processed by CPU, CPUs with stronger processing ability need to be selected. However, this will increase the cost inevitably, and also decrease the competitiveness of products; further, with regard to some protocol messages which are sensitive to time, the requirements are difficult to meet even though the CPU with stronger processing ability are chosen. Generally, in this case, an extended processor chip is needed to be externally attached to the switch chip to assist to accomplish certain processing for protocol message.

A physical port connected to CPU in a switch chip is generally special port of the switch chip, when CPU is receiving packets, the message would carry source physical port information; the CPU may designate destination port when sending the packet, so that CPU could receive and send packet normally. However, if the port which connects the switch chip and the extended CPU is normal physical port, the switch chip cannot make the message carry source physical port information when the extended processor is receiving the packets; the switch chip cannot designate the destination physical port of the message when the extended processor is sending the packets, which would lead to that the action of transmitting message between the extended processor and the switch chip cannot be carried out.

CONTENT OF THE INVENTION

The technical problem to be solved by the present invention is to provide a method and system for realizing transmitting message between the extended processor and switch chip, to realize transmitting message between the extended processor and switch chip.

In order to attain the above goal, the technological schemes of the present invention may be carried out as following:

A method for realizing transmission of message between an extended processor and a switch chip, the method comprising:

the switch chip amending the destination MAC of the received first message used to be sent to extended processor as the first destination MAC, and then sending the first message to the extended processor, wherein the switch chip corresponding to the first destination MAC is used to receive service physical port of the first message;

the extended processor resolving the first destination MAC, and learning that the first message is from the service physical port.

The method further comprising:

The extended processor adding related information into the second message used to be sent to the switch chip, and sending the second message to the switch chip; the related information comprising the second destination MAC and multi-protocol tag switch MPLS tunnel tag.

The method further comprising:

the switch chip determining the egress port of the second message according to the second destination MAC and the MPLS tunnel tag.

The step of the switch chip determining the egress port of the second message according to the second destination MAC and the MPLS tunnel tag specifically comprising:

the switch chip determining that MPLS processing needs to be performed for the second message according to the second destination MAC;

the switch chip performing the tunnel ending for the second message according to the tag value of MPLS tunnel tag, and obtaining the egress port corresponding to the tag value.

The method of the switch chip performing the tunnel ending for the second message comprising:

the switch chip deleting the related information of the second message.

A system for realizing transmission of message between an extended processor and a switch chip, the system comprising a switch chip and a extended processor, wherein the switch chip comprising the service physical port used to receive the first massage processed by the extended processor, wherein:

the switch chip is used to amend the destination MAC of the first message as the first destination MAC corresponding to the service physical port and to send the amended first message to the extended processor;

the extended processor is used to resolve the first destination MAC to learn that the first message is from the service physical port.

The extended processor is further used to add related information into the second message used to be sent to the switch chip, and send the second message to the switch chip; the related information comprises the second destination MAC and multi-protocol tag switch MPLS tunnel tag.

The switch chip is further used to determine the egress port of the second message according to the second destination MAC and the MPLS tunnel tag.

The numbers of the switch chips and the extended processors are one respectively.

The system is set in a switch device.

Compared with the prior art, the switch chip of the present invention can amend the destination MAC of the message which will be sent to the extended processor as the destination MAC corresponding to the port at which the message is received by the switch chip, thus the extended processor can obtain the source of the message. The present invention can implement the message transmission between the extended processor and the switch chip.

PREFERRED EMBODIMENTS OF THE PRESENT INVENTION

The method and system for realizing transmission of message between an extended processor and a switch chip of present invention will be described in combination with the accompanying figures.

Figure 1:
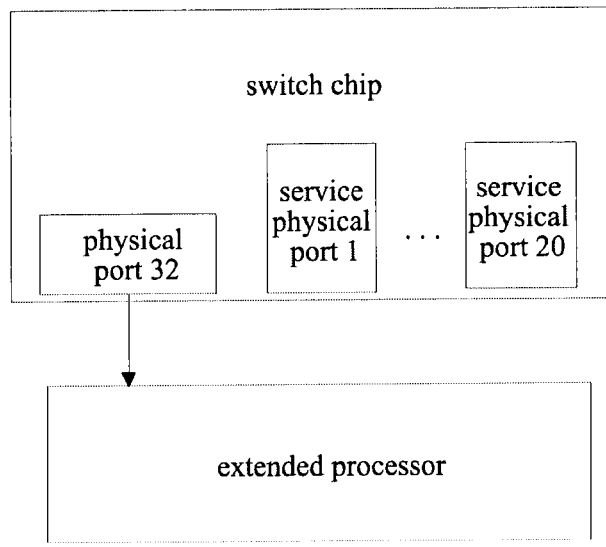
FIG. 1 is a connection diagram of system for realizing extended processor receiving and sending packet by preferred embodiment of present invention.

Referring to FIG. 1, as the preferred embodiment of present invention, a system for realizing transmission of message between an extended processor and a switch chip is shown in FIG. 1, the system includes at least one switch chip and at least one extended processor, the switch chip includes physical port 32 used to connect extended processor and service physical ports 1~20.

The switch port is used to amend the destination MAC of the message as the destination MAC corresponding to the service physical port, and then send the message to the extended processor, and receive the message from extended processor and determine the egress port of message according to the destination MAC and the MPLS tunnel tag of the received message. The extended processor is used to resolve the destination MAC of the message from the switch chip to learn which service physical port the message is from, and send the message to the switch chip after adding related information to the message which is to be sent to switch chip, wherein the related information includes the destination MAC and MPLS tunnel tag of the message.

Figure 2:
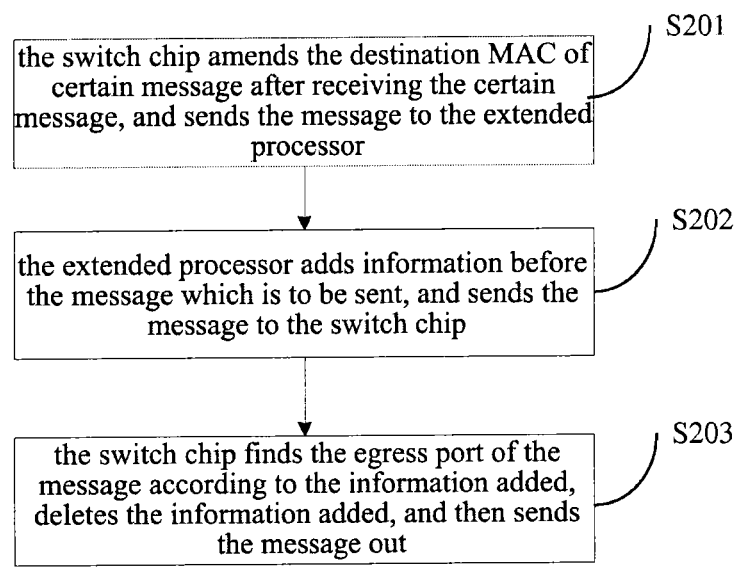
FIG. 2 is a specific flowchart of method for realizing extended processor receiving and sending packet by preferred embodiment of present invention.

In the following, the method for realizing transmission of message between an extended processor and a switch chip is illustrated in combination with FIG. 2, the specific procedure shown in FIG. 2 is as bellow:

S201: the switch chip receives the message which comes from the service physical port and is to be sent to extended processor, and then amends the destination MAC of the message as 00.00.00.00.00.03, and sends the message to the extended processor through the physical port 32. The destination MAC is 00.00.00.00.00.03, corresponding to the service physical port 3.

In this embodiment, the message sent to extended processor is the message with Ethernet type being 0xfe47.

S202: The extended processor resolves the message destination MAC as 00.00.00.00.00.03 after receiving the message, thus learning that the message is sent through the service physical port 3 of the switch chip, and then the extended processor adds related information into the message to be sent, the related message includes the destination MAC (01.02.03.04.05.06), the MPLS tag (tag value is configured to be 1048558), after that, the message with the added information is sent to the switch chip through the physical port 32.

S203: The switch chip performs the MPLS procedure for the message according to the destination MAC (01.02.03.04.05.06) of the message after receiving the message which comes from the physical port 32, furthermore, the switch chip performs the tunnel ending processing for the message according to the tag value 104558 of the MPLS tag of the message (tunnel ending refers to that the extended processor deletes the added information to restore the original message), and sends the message through the service physical port 3 according to the tag value 104558 of the MPLS tag of the message.

The tunnel ending processing is performed when the tag value of the MPLS tag of the message is 104855~61048575 (using 20 tags with the maximum tag values), the egress ports corresponding to the above-mentioned MPLS tag values are service physical ports 1~20 respectively, e.g. if the tag value is 1048556, the egress port of the message is service physical port 1; if the tag value is 1048557, the egress port of the message is service physical port 2.

To sum up, in present invention, the switch chip amends the destination MAC of the message which is to be sent to extended processor as the destination MAC of the port at which the message is received corresponding to the switch chip, so that the extended processor could learn where is the message from. The method and system of present invention could realize transmitting message between the extended processor and the switch chip.

What is said above is the preferred embodiment of present invention which is not intended to limit the present invention, any modifications, alternatives and improvements within the spirit and principle of the present invention should be considered as falling into the protection scope of the present invention.

What I claimed is:

1. A method for realizing transmission of message between an extended processor and a switch chip, comprising:
   the switch chip amending destination MAC of received first message used to be sent to the extended processor as a first destination MAC, and then sending the first message to the extended processor, wherein the switch chip corresponding to the first destination MAC is used to receive a service physical port of the first message;
   the extended processor resolving the first destination MAC to learn that the first message is from the service physical port.

2. The method according to claim 1, further comprising:
   the extended processor adding related information to a second message used to be sent to the switch chip, and sending the second message to the switch chip; the related information comprising a second destination MAC and a multi-protocol tag switch (MPLS) tunnel tag.

3. The method according to claim 2, further comprising:
   the switch chip determining an egress port of the second message according to the second destination MAC and the MPLS tunnel tag.

4. The method according to claim 3, wherein the step of the switch chip determining the egress port of the second message according to the second destination MAC and the MPLS tunnel tag specifically comprising:
   the switch chip determining that MPLS processing needs to be performed for the second message according to the second destination MAC;
   the switch chip performing tunnel ending for the second message according to a tag value of the MPLS tunnel tag, and learning the egress port corresponding to the tag value.

5. The method according to claim 4, wherein a way for the switch chip performing the tunnel ending for the second message is:
   the switch chip deleting the related information of the second message.

6. A system for realizing transmission of message between an extended processor and a switch chip, comprising a switch chip and a extended processor, wherein the switch chip comprises a service physical port used to receive a first massage processed by the extended processor, wherein:
   the switch chip is used to amend a destination MAC of the first message as a first destination MAC corresponding to the service physical port and then to send amended first message to the extended processor;
   the extended processor is used to resolve the first destination MAC to learn that the first message is from the service physical port.

7. The system according to claim 6, wherein the extended processor is also used to add related information into a second message used to be sent to the switch chip, and send the second message to the switch chip; the related information comprising a second destination MAC and a multi-protocol tag switch (MPLS) tunnel tag.

8. The system according to claim 7, wherein the switch chip is also used to determine an egress port of the second message according to the second destination MAC and the MPLS tunnel tag.

9. The system according to claims 6, wherein the numbers of the switch chips and the extended processors are one respectively.

10. The system according to claims 6, wherein the system is set in a switch device.

11. The system according to claim 7, wherein the numbers of the switch chips and the extended processors are one respectively.

12. The system according to claim 8, wherein the numbers of the switch chips and the extended processors are one respectively.

13. The system according to claim 7, wherein the system is set in a switch device.

14. The system according to claim 8, wherein the system is set in a switch device.

* * * * *